(12) United States Patent  (10) Patent No.: US 9,126,639 B2
Hoelzel et al.  (45) Date of Patent: Sep. 8, 2015

(54) AIR GUIDING DEVICE FOR A MOTOR VEHICLE

(71) Applicants: Dr. Ing. h.c. F. Porsche Aktiengesellschaft, Stuttgart (DE); Apollo Vredestein B.V., RD-Enschede (NL)

(72) Inventors: Steffen Hoelzel, Eberdingen (DE); Bjorn Foerster, Wurmberg (DE); Gerard Nijman, AV-Losser (NL); Mike Ludovica Karel Peeters, Vlimmeren (BE); Louis-Phillippe Antoine Eugene Maria Reuvekamp, GE-Enschede (NL)

(73) Assignees: Dr. Ing. h.c.F. Porsche Aktiengesellschaft (DE); Apollo Vredestein B.V. (NL)

( * ) Notice: Subject to any disclaimer, the term of this patent is extended or adjusted under 35 U.S.C. 154(b) by 9 days.

(21) Appl. No.: 14/060,902

(22) Filed: Oct. 23, 2013

(65) Prior Publication Data

US 2014/0110970 A1    Apr. 24, 2014

(30) Foreign Application Priority Data

Oct. 23, 2012    (DE) .................... 10 2012 020 738

(51) Int. Cl.
*B62D 35/00*    (2006.01)
(52) U.S. Cl.
CPC .................................... *B62D 35/005* (2013.01)
(58) Field of Classification Search
CPC ...................................................... B62D 35/005

USPC .................. 296/180.1, 180.5, 180.3; 180/903
See application file for complete search history.

(56) References Cited

U.S. PATENT DOCUMENTS

| 6,953,218 B2 * | 10/2005 | Jungert ...................... 296/180.1 |
| 7,040,690 B2 * | 5/2006 | Soja et al. .................. 296/180.5 |
| 8,562,067 B2 | 10/2013 | Hoelzel et al. |
| 2003/0116996 A1 | 6/2003 | Soja et al. |
| 2005/0012359 A1 | 1/2005 | Jungert |

FOREIGN PATENT DOCUMENTS

| DE | 101 60 748 | 6/2003 |
| DE | 103 25 654 | 12/2004 |
| DE | 10 2011 111 456 | 2/2013 |

OTHER PUBLICATIONS

International Search Report of Jun. 19, 2013.

* cited by examiner

*Primary Examiner* — Joseph D. Pape
*Assistant Examiner* — Dana Ivey
(74) *Attorney, Agent, or Firm* — Gerald E. Hespos; Michael J. Porco; Matthew T. Hespos

(57) ABSTRACT

An air guiding device (10) for a motor vehicle has a spoiler lip (12) mountable on a front part (8) of the motor vehicle via an adapter (32) and extends in the transverse direction (FQ) of the vehicle. A pneumatic actuating device (28) shifts the spoiler lip (12) between a retracted rest position and an extended position. A flexurally elastic rod (24) is guided in a guide (26) near the free end of the spoiler lip (12). The spoiler lip (12) is mounted on the adapter (32) so that the spoiler lip (12), even in the retracted rest position, is under a prestress that opposes the shifting of the spoiler lip (12) out of the rest position into an extended position.

6 Claims, 3 Drawing Sheets

AIR GUIDING DEVICE FOR A MOTOR VEHICLE

CROSS REFERENCE TO RELATED APPLICATION

This application claims priority under 35 USC 119 to German Patent Appl. No. 10 2012 020 738.7 filed on Oct. 23, 2012, the entire disclosure of which is incorporated herein by reference.

BACKGROUND

1. Field of the Invention

The invention relates to an air guiding device that has a spoiler lip and that is mountable on a front part of a motor vehicle via an adapter. A pneumatic actuating device shifts the spoiler lip between a retracted rest position and an extended position.

2. Description of the Related Art

US 2003/0116996 and US 2005/0012359 disclose spoiler devices that have a spoiler lip extending in the transverse direction of the vehicle at the front of the vehicle. The spoiler lip is made of an elastomer and a pneumatic actuating device moves the spoiler lip between a retracted rest position and an extended maximum position to optimize an aerodynamic effect with respect to output values of the motor vehicle. The pneumatic actuating device of the air guiding device known from the prior art comprises a pneumatic actuator with chambers that can be filled or emptied to transfer the spoiler lip between the retracted rest position and the extended maximum position. The elastomer of the spoiler lip is deformed elastically during the filling operation, thus building up a restoring force, which, during the emptying operation, returns the spoiler lip back in the direction of the rest position again.

In the cold, elastomers from which the spoiler lip can be manufactured have increased hysteresis values that make it difficult for the spoiler lip to return automatically in the direction of the rest position. Furthermore, in the cold, the relaxation properties of the elastomers change, and therefore, if the spoiler lip were extended for a prolonged period in the cold, the spoiler lip would require a prolonged period to be able to be transferred again from the extended position into the retracted rest position. This cold retraction behavior of the spoiler lip is disadvantageous.

It is the object of the present invention to provide a novel air guiding device for a motor vehicle.

SUMMARY OF THE INVENTION

The spoiler lip of the invention is mounted on the adapter device in such a manner that the spoiler lip, in the retracted rest position, is under a prestress that opposes the shifting of the spoiler lip out of the rest position into an extended position. The cold retraction behavior of the spoiler lip can be improved fact that the spoiler lip is already under a prestress in the retracted rest position.

The spoiler lip, in a state removed from the adapter device, preferably has a greater curvature than in the rest position in a state mounted on the adapter device. The prestressing component, which is brought about by the curvature of the spoiler lip in the rest position of same, opposes a movement of the free end of the spoiler lip along a curved path during the transfer of the spoiler lip from the retracted rest position and into an extended position.

The spoiler lip is assigned at least one spring in the region of a flexurally elastic rod member associated with the spoiler lip. The spring exerts a prestress on the spoiler lip into the rest position. The prestressing component of the spoiler lip is brought about by the spring in the rest position of the spoiler lip. The spring opposes a change in length of the free end of the spoiler lip during the transfer of the spoiler lip from the retracted rest position and into an extended position.

The spring preferably is a spiral spring which extends spirally around the rod member and preferably is vulcanized under prestress into the spoiler lip. A spirally formed spring that is guided around the rod permits a particularly advantageous provision of the prestressing component that acts in the transverse direction of the vehicle in the rest position for the spoiler lip.

Exemplary embodiments of the invention are explained in more detail, without being restricted thereto, with reference to the drawing.

DETAILED DESCRIPTION OF THE PREFERRED EMBODIMENTS

Figure 1:
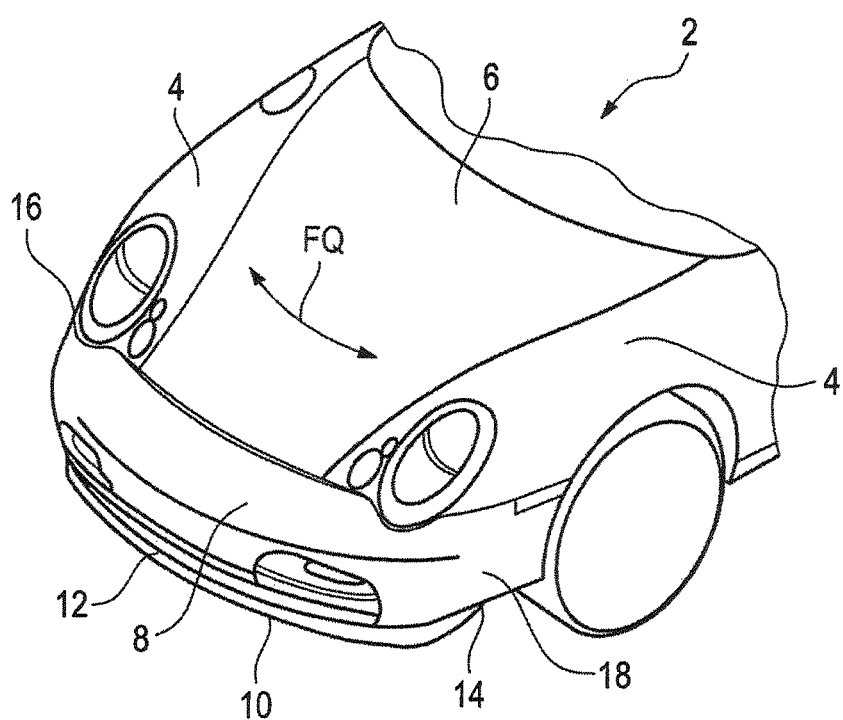
FIG. 1 is a perspective view of a front region of a motor vehicle with an air guiding device according to the invention.

FIG. 1 shows a front section 2 of a motor vehicle. The front section 2 comprises lateral wings 4, an engine hood 6 arranged in between, and a front part 8 mounted in front of the engine hood 6 and the wings 4. The front part 8 forms the front end of the front portion 2 of the motor vehicle.

An air guiding device 10 according to the invention, of which only a spoiler lip 12 can be seen in the present view, is arranged below the front part 8. In the present view, the spoiler lip 12 is in a retracted rest position. The spoiler lip 12 extends substantially in the transverse direction FQ of the vehicle and ends with free ends 14, 16 on the lower side of lateral longitudinal sections 18 of the front part 8.

Figure 2:
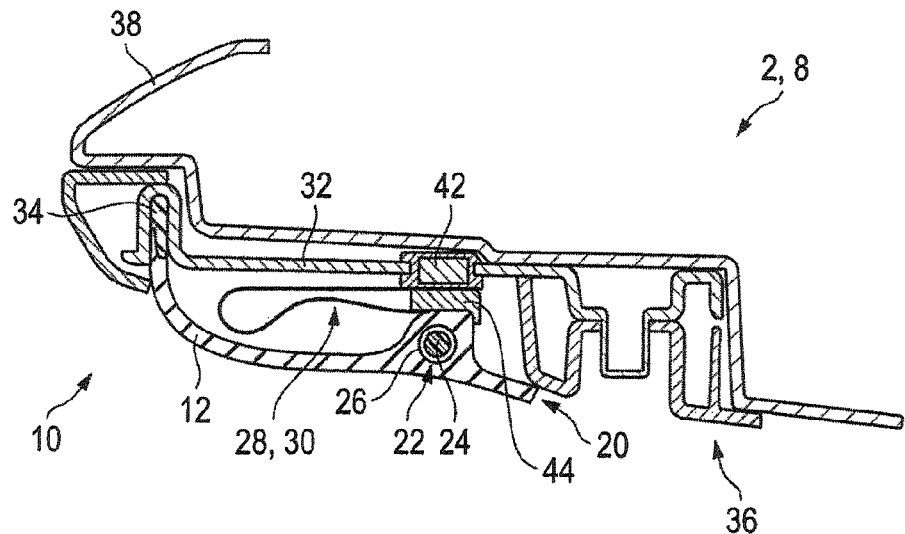
FIG. 2 is a sectional view of FIG. 1 in a first state of the air guiding device.
Figure 3:
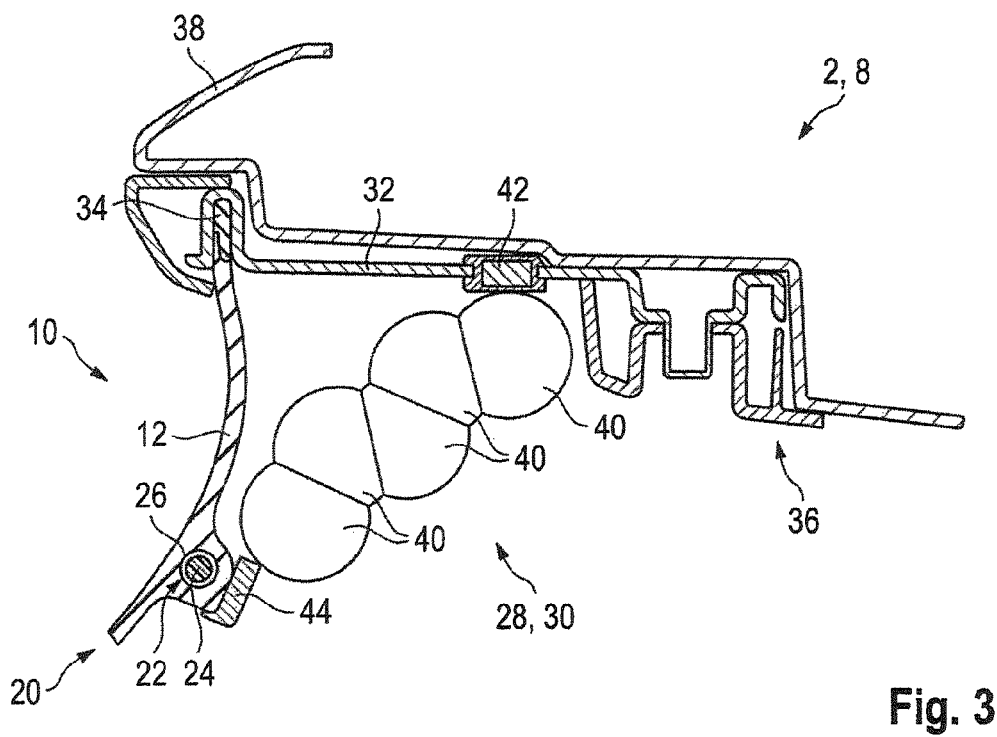
FIG. 3 is sectional view similar to FIG. 2, but showing a second state of the air guiding device.

FIGS. 2 and 3 show a cross section through the front section of the motor vehicle from FIG. 1 in the region of the air guiding device 10. The cross sections in FIG. 2 and FIG. 3 run in the longitudinal direction of the motor vehicle. FIG. 2 shows the air guiding device 10 in a retracted, horizontal state or a rest position, and FIG. 3 shows same in a maximally extended, vertical state.

The spoiler lip 12 of the air guiding device 10 preferably is manufactured from an elastomer and, during the transfer from the rest position shown into an extended position, is subject to a change in length in the transverse direction FQ of the vehicle.

A channel 22 which extends in the transverse direction FQ of the vehicle adjacent to a free end 20 of the spoiler lip 12 and a flexurally elastic rod 24 is inserted into the channel 22.

The flexurally elastic rod 24 is guided movably in a guide device 26 that preferably comprises a longitudinally elastic weather strip extending over the entire length of the spoiler lip.

The flexurally elastic rod 24 preferably is manufactured from a PTFE, a GFRP-covered PTFE or from a different plastic, so that rod 24 can be guided in the guide device 26 with minimal static friction and sliding friction.

The air guiding device 10 has a pneumatic actuating device 28 to shift the spoiler lip 12 between the retracted rest position and an extended position. The pneumatic actuating device 28 has a pneumatic actuator 30 that is fillable with or is emptyable of air.

The air guiding device 10 has an adapter 32 and the spoiler lip 12 is mounted on the adapter 32 by a vulcanized-on end 34 that is opposite the free end 20. The vulcanized-on end 34 of the spoiler lip 12 and the adapter device 32 preferably are connected via a clip connection.

The air guiding device 10 also has a fastening device 36. The adapter 32 and the fastening device 36 first are connected to each other, and the air guiding device 10 then is connectable via the adapter device 32 and the fastening device 36 to a front panel 38 of the front part 8 of the motor vehicle.

The pneumatic actuator 30 has a plurality of air-fillable chambers 40, and in the exemplary embodiment shown, the actuator 30 has four chambers 40 of this type. A first outer chamber 40 acts on the spoiler lip 12 adjacent to the free end 20, and a second outer chamber 40 acts on the adapter plate 32.

Central chambers 40 are arranged between the two outer chambers 40. The central chambers 40 are adjacent to one of the outer chambers 40 and/or to at least one central chamber 40.

The adapter device 32 and the spoiler lip 12 are assigned magnetically active holding elements 42 and 44 to hold and to fix the spoiler lip 12 in the retracted position on the adapter plate 12. The magnetically active holding elements 42 are assigned to the adapter device 32 and the magnetically active holding elements 44 are assigned to the spoiler lip 12.

To improve a cold retraction behavior of the spoiler lip 12 at low external temperatures, the spoiler lip 12 is mounted on the adapter device 32 so that the spoiler lip 12 is already under a prestress in the retracted rest position (see FIG. 2). The prestress of the spoiler lip 12 transfers the spoiler lip 12 into the rest position and opposes the shifting of the spoiler lip 12 out of the rest position into an extended position.

In the illustrated embodiment, the prestress is provided by two prestressing components, but it is possible to use only one of the prestressing components described below.

A first prestressing component for the spoiler lip 12 in the rest position of same is provided by the fact that the spoiler lip 12, in a state removed from the adapter 32, has a greater curvature than in a rest position in the state mounted on the adapter 32.

Figure 4:
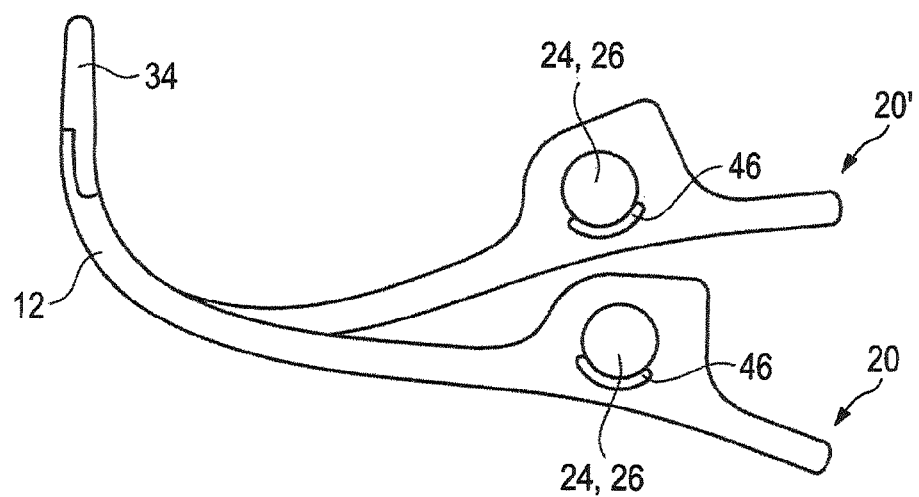
FIG. 4 shows different curvature of a spoiler lip of the air guiding device.

FIG. 4 shows the spoiler lip 12 in two different states of curvature, wherein it can be gathered from FIG. 4 that, if the spoiler lip 12 is removed, the free end 20' of the spoiler lip 12 is curved more sharply in relation to the end 34 than if the spoiler lip 12 is mounted on the adapter device 32. The prestressing component of the spoiler lip 12 that is brought about by the curvature of the spoiler lip 12 in the rest position, opposes a movement of the free end 20 of the spoiler lip 12 along a curved path during the transfer of the spoiler lip 12 from the retracted rest position into the extended position. It can be gathered from a comparison of FIGS. 2 and 3 that, during the movement from the retracted rest position into the extended position, the spoiler lip 12 is moved from the top at the rear to the bottom at the front along a curved path.

A further prestressing component for the spoiler lip 12 is provided in the illustrated embodiment by at least one spring element 46 that exerts the second prestressing component on the spoiler lip 12 in the rest position in the region of flexurally elastic rod 24. Each spring 46 of the second prestressing component acts on the spoiler lip 12 in the rest position thereof and opposes a change in length of the free end 20 of the spoiler lip 12, which change in length arises during the transfer of the spoiler lip 12 from the retracted rest position into the extended position.

A single spring element 46 preferably is provided and is designed as a spiral spring that extends spirally around the rod 24. The spiral spring 46 is vulcanized under prestress into the spoiler lip 12 or is fixedly connected thereto in another manner.

The uncoiling of the spiral spring increases when the spoiler lip 12 is extended out of the retracted rest position, thus increasing the restoring force acting on the spoiler lip 12.

With the first prestressing component and/or the second prestressing component, which already exert a prestress on the spoiler lip 12 in the rest position of same, the cold retraction behavior of the spoiler lip 12 during the transfer of the spoiler lip 12 from an extended position into the retracted rest position can be improved. Even if the spoiler lip 12 has been extended for a prolonged period at low external temperatures and therefore the elastic restoring forces of the spoiler lip material are reduced, the spoiler lip 12 can then be transferred reliably and within a short time into the rest position.

What is claimed is:

1. An air guiding device for a front part of a motor vehicle, comprising:
   an adapter mounted to the front part of the motor vehicle;
   a spoiler lip extending in a transverse direction of the vehicle, the spoiler lip having a first end mounted to the adapter and a free end spaced from the first end;
   a pneumatic actuating device for shifting the spoiler lip between a retracted rest position and an extended position;
   a guide device formed in proximity to the free end of the spoiler lip and extending in the transverse direction;
   a flexurally elastic rod disposed in the guide device; and
   at least one spiral spring extending spirally around the flexurally elastic rod and fixedly connected in the spoiler lip in a prestressed state so that the at least one spiral spring exerts a prestress on the spoiler lip into the rest position.

2. The air guiding device of claim 1, wherein an arc length of the spoiler lip in the extended position is greater than an arc length of the spoiler lip in the retracted rest position.

3. The air guiding device of claim 2, wherein the arc length of the spoiler lip in the rest position opposes a movement of the free end of the spoiler lip along a curved path during the transfer of the spoiler lip from the retracted rest position into the extended position.

4. The air guiding device of claim 1, wherein the at least one spiral spring is configured to oppose a change in length of the free end of the spoiler lip when the spoiler lip is shifted from the retracted rest position to the extended position.

5. The air guiding device of claim 1, wherein the at least one spiral spring is vulcanized.

6. An air guiding device for a front part of a motor vehicle, comprising:
   an adapter mounted to the front part of the motor vehicle;
   a spoiler lip extending in a transverse direction of the vehicle, the spoiler lip having a first end mounted to the adapter and a free end spaced from the first end;
   a pneumatic actuating device for shifting the spoiler lip between a retracted rest position and an extended position;
   a guide device formed in proximity to the free end of the spoiler lip and extending in the transverse direction;

a flexurally elastic rod disposed in the guide device; and
at least one spiral spring vulcanized in a prestressed state and extending spirally around the flexurally elastic rod so that the at least one spiral spring exerts a prestress on the spoiler lip into the rest position.

\* \* \* \* \*